(12) United States Patent
Coates et al.

(10) Patent No.: US 10,961,133 B2
(45) Date of Patent: Mar. 30, 2021

(54) REVERSE DIFFUSION DESALINATION

(71) Applicant: SIGNAL ONE INTERNATIONAL IP, LLC, Dallas, TX (US)

(72) Inventors: James Albert Coates, Casper, WY (US); Charles R. Coates, Renton, WA (US)

(73) Assignee: Signal One International IP, LLC, Dallas, TX (US)

( * ) Notice: Subject to any disclaimer, the term of this patent is extended or adjusted under 35 U.S.C. 154(b) by 0 days.

(21) Appl. No.: 16/575,602

(22) Filed: Sep. 19, 2019

(65) Prior Publication Data

US 2020/0010339 A1 Jan. 9, 2020

Related U.S. Application Data

(62) Division of application No. 15/710,006, filed on Sep. 20, 2017, now Pat. No. 10,683,217.

(60) Provisional application No. 62/486,682, filed on Apr. 18, 2017, provisional application No. 62/397,031, filed on Sep. 20, 2016.

(51) Int. Cl.
| | | |
|---|---|---|
| *B03C 9/00* | (2006.01) | |
| *C02F 1/46* | (2006.01) | |
| *C02F 1/461* | (2006.01) | |
| *C02F 1/26* | (2006.01) | |
| *C02F 1/469* | (2006.01) | |
| *C02F 103/08* | (2006.01) | |
| *B03C 3/47* | (2006.01) | |
| *B03C 5/02* | (2006.01) | |

(52) U.S. Cl.
CPC ............. *C02F 1/4604* (2013.01); *B03C 9/00* (2013.01); *C02F 1/265* (2013.01); *C02F 1/469* (2013.01); *C02F 1/46109* (2013.01); *B03C 3/47* (2013.01); *B03C 5/02* (2013.01); *C02F 2001/46152* (2013.01); *C02F 2103/08* (2013.01); *C02F 2201/46175* (2013.01); *C02F 2301/022* (2013.01)

(58) Field of Classification Search
CPC ....................................................... B03C 9/00
See application file for complete search history.

(56) References Cited

U.S. PATENT DOCUMENTS 5,389,214 A * 2/1995 Erickson ................. C02F 1/008
205/701

* cited by examiner

*Primary Examiner* — Salil Jain
(74) *Attorney, Agent, or Firm* — Hunton Andrews Kurth LLP

(57) ABSTRACT

The systems and methods described herein relate to use of a reverse diffusion system for removal of dissolved ions from a fluid, for example, salt ions. Specific embodiments include a system for desalinating salt water to produce potable water. The systems and methods can include pulsing low levels of electricity via electrodes in a scrolling pattern, so as to sweep the ions across a unit.

18 Claims, 22 Drawing Sheets
(10 of 22 Drawing Sheet(s) Filed in Color)

FIG. 2A

| Energizing Sequence | | | | | | |
|---|---|---|---|---|---|---|
| Pulse 1 | Pulse 2 | Pulse 3 | Pulse 4 | Pulse 5 | Pulse 6 | Pulse 7 |

FIG. 2B

Parallel 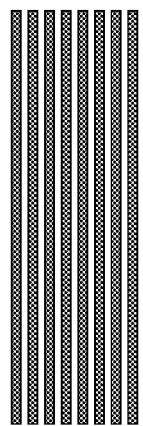 Radial 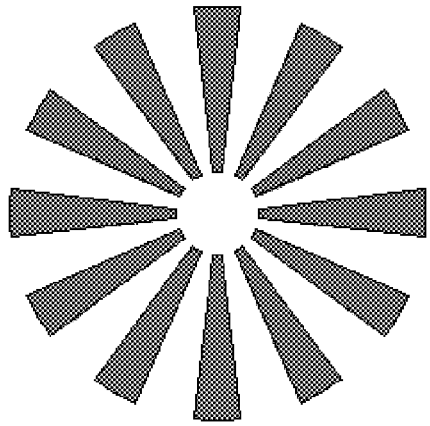 Concentric 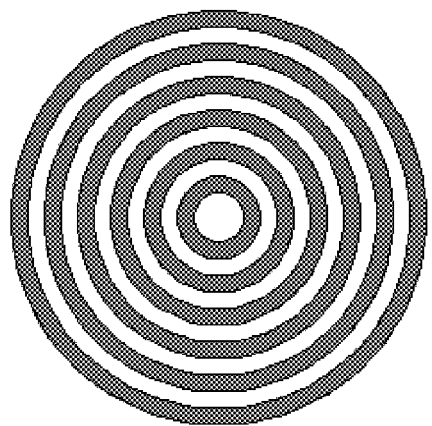
FIG. 3

REVERSE DIFFUSION DESALINATION

CROSS-REFERENCE TO RELATED APPLICATIONS

This application is a Divisional Application of U.S. Utility patent application Ser. No. 15/710,006, filed Sep. 20, 2017, which claims priority to U.S. Provisional Application No. 62/397,031, filed Sep. 20, 2016, entitled "Reverse Diffusion System," and U.S. Provisional Application No. 62/486,682, filed Apr. 18, 2017, entitled "Reverse Diffusion Desalination." The disclosures of these priority applications are incorporated herein by reference in their entireties.

FIELD OF THE VARIOUS EMBODIMENTS

The systems and methods described herein relate to use of a reverse diffusion system for removal of dissolved salts from a fluid. Specific embodiments include a system for desalinating salt water (brine) to produce potable water.

BACKGROUND OF INVENTION

The demand for fresh water is becoming a critical issue in many nations of the world. Providing pure, fresh water to a burgeoning population of domestic, agricultural and industrial users is becoming increasingly difficult as existing sources of fresh water are stressed to their limits.

Paradoxically, the oceans of the world contain millions of cubic miles of salt water unfit for human consumption. In addition to the oceans, vast amounts of brackish waters and salt brines exist in underground aquifers beneath some of the most parched and barren deserts on earth.

In addition to the high salt content of the seas, many sources of fresh water have been contaminated with heavy metals from industrial waste. Many, once pristine waters, are now too toxic to consume.

Many desalination plants are in operation today producing millions of gallons of potable water from the sea, but the associated high capital and operating costs of these facilities prevent all but the wealthiest nations from using the current technologies. These and other deficiencies exist.

SUMMARY OF EMBODIMENTS OF THE INVENTION

When a water soluble salt dissolves, very little energy is required to disperse the ions throughout the solution. The energy required is manifested as a slight increase in entropy of the salt water system. Classically, the process of diffusion is considered to be thermodynamically irreversible. Left isolated, at constant temperature and pressure, the dissolved salt will not spontaneously crystallize into solid salt.

An energy efficient method has been found to reverse the process of diffusion thus decreasing the entropy of the salt water system, making available, at very low cost, virtually unlimited fresh water for agriculture and human consumption from seawater and salt water brines.

In some embodiments, the removal of ions, ionic complex, ionic compounds, and charged particles from a fluid, can be accomplished by placing fluid that includes ions, ionic complex, ionic compounds, and/or charged particles in contact with an electrode panel, but not in direct contact with the electrodes. The electrode panel can include electrodes, where the fluid is allowed to flow across the electrode panel. The electrode panel may be made from a hydrophobic material. The electrodes can be provided with an electric charge in an alternating pattern across the electrode panel so that the ions, ionic complex, ionic compounds, and/or charged particles are caused to move across the electrode panel from one side to another side.

The electrode assembly can include an electrode module, which can include two or more electrode panels that are congruently aligned. The two or more electrode panels can be electrically and physically isolated from each other and/or the fluid.

The alternating pattern provided by the electric charge can be a scrolling pattern. The scrolling pattern can be any number of items long, such as a scrolling pattern that is 3, 4, 5, 6, 7, 8, 9, 10, 11, 12, 13, 14, 15, 16, 17, 18, 19, 20, 21, 22, 23, 24, 25, 26, 27, 28, 29, 30, or greater than 30 items long before repeating. For example, the scrolling pattern could be greater than 35, greater than 40, greater than 45, greater than 50, greater than 55, greater than 60, greater than 65, greater than 70, greater than 75, or greater than 100 items long before repeating.

The fluid can be static or dynamic through the system. The electrodes can be embedded in a panel. The panel can be made of any material that is non-conductive and impervious to fluid penetration, such as plastic, ceramic, or glass.

If the fluid is dynamic, laminar flow can be maintained. Laminar flow is defined herein as having a low Reynolds number (e.g., less than 2300).

In any of the embodiments described herein, the electrodes can be arrayed in at least one of a parallel, a radial, and a concentric pattern. The electrodes can be arrayed in a horizontal pattern.

The spacing and/or shape of the electrodes within the pattern can be varied. The electrode panels can be made from an oleophobic material.

In any of the embodiments described herein, the fluid can be additionally passed over the electrode panels through an additional electrode module connected in sequence to the electrode module.

In some embodiments, a system for the removal of ions, ionic complex, ionic compounds, and/or charged particles from a fluid is described. The system can include a housing with an electrode panel, a fluid inlet port, a fluid outlet port; and a control circuit. The electrode panel can include more than one electrode, and can be made of a hydrophobic material. The control circuit can include a processor, and can be connected to the electrodes to provide electrical and/or electronic energy to the electrodes in a pattern. The scrolling pattern can be any number of items long, such as a scrolling pattern that is 3, 4, 5, 6, 7, 8, 9, 10, 11, 12, 13, 14, 15, 16, 17, 18, 19, 20, 21, 22, 23, 24, 25, 26, 27, 28, 29, 30, or greater than 30 items long before repeating.

The electrodes can be arrayed in a parallel, a radial, and/or a concentric pattern. The spacing and/or shape of the electrodes within the pattern can be varied. The electrode panels can be made from an oleophobic material. The system can include an assembly, which can include a module. The module can include two or more electrode panels.

The fluid within the system can be static or dynamic. When the fluid is static, the system can include an electrode module that can include at least two electrode panels. The electrodes can be embedded in the electrode panel. The panel can be made of any material that is non-conductive and impervious to fluid penetration, such as plastic, ceramic, or glass. The system can also include spacer bars to separate the electrode panels.

The system can include at least four electrode panels. The system can include an electrostatic shield between two or more modules to prevent electrical interference from adjacent modules.

When the fluid is dynamic, the system can include a pump to pump the fluid into the system. The system can also be operated so as to maintain laminar flow, e.g., maintain a low Reynolds number (such as less than 2300) throughout the flow of the fluid. The system can also include a contaminate flow channel and a concentrate fluid channel located on the electrode panel, a guard electrode, and/or ion channel separators.

The electrodes can be arrayed in a horizontal pattern. The system can be a continuous flow system. Multiple systems can be connected in at least one of a series, a parallel, and a series-parallel combination.

In any of the methods and/or systems described herein, the electrodes are electrically and physically isolated from the fluid.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2A depicts sequencing patterns for electrodes according to exemplary embodiments.

FIG. 2B depicts sequencing patterns for electrodes according to exemplary embodiments.

FIG. 3 depicts various array patterns for electrodes according to exemplary embodiments.

DETAILED DESCRIPTION OF EMBODIMENTS OF THE INVENTION

Figure 1:
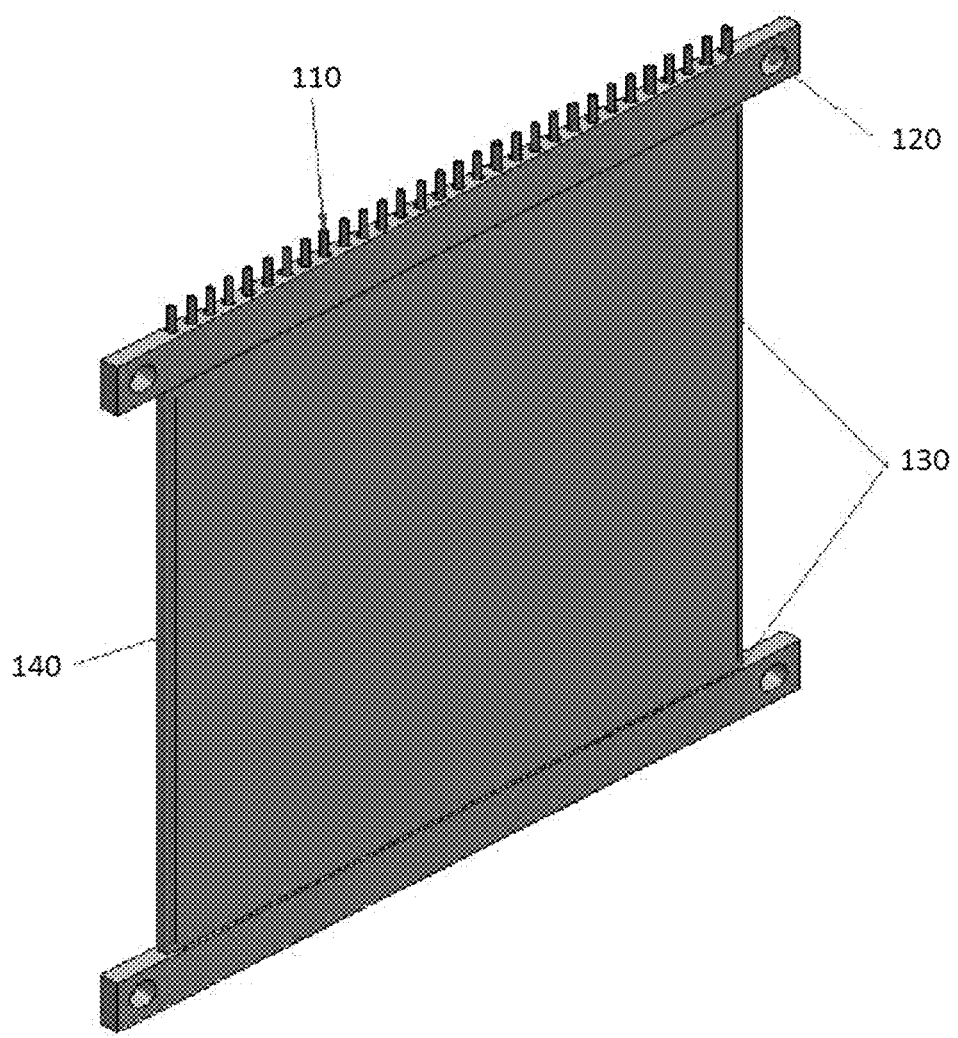
FIG. 1 depicts an electrode panel according to exemplary embodiments.

Exemplary embodiments are described in the attached documentation which form the specification of the present application. The attached documentation includes a description of the reverse diffusion process in accordance with exemplary embodiments and a description of testing performed to demonstrate exemplary embodiments. The testing description includes a series of figures illustrating the testing configuration. Larger versions of these figures are included also (specifically of FIGS. 2, 3, 4, 5 of the testing description). Further, figures depicting the various components of the testing configuration are included, as well as figures depicting an exemplary commercial embodiment of a 2000 gpd (gallons per day) system.

It should be appreciated that while desalination of water is used as an example in the present description, this is meant to be exemplary and non-limiting as exemplary embodiments may have application beyond desalinization of water to include the removal of ions, ionic complexes, and/or charged particles from water and other fluids. Various embodiments may have application for water softening. Accordingly, exemplary embodiments may have application in residential, commercial, and industrial settings.

It will be readily understood by those persons skilled in the art that the embodiments described are capable of broad utility and application. Accordingly, while the various embodiments are described in detail in relation to the exemplary embodiments, it is to be understood that this disclosure is illustrative and exemplary of embodiments and is made to provide an enabling disclosure of the exemplary embodiments. The disclosure is not intended to be construed to limit the various embodiments or otherwise to exclude any other such embodiments, adaptations, variations, modifications and equivalent arrangements.

The descriptions are provided of different configurations and features according to exemplary embodiments. For example, configurations and features relating to a desalination system and method using a reverse diffusion have been described. Other embodiments and applications are possible using the principles described herein. Thus, while certain nomenclature and types of applications or hardware are described, other names and applications or hardware usage is possible and the nomenclature provided is done so by way of non-limiting examples only. Further, while particular embodiments are described, these particular embodiments are meant to be exemplary and non-limiting and it further should be appreciated that the features and functions of each embodiment may be combined in any combination as is within the capability of one of ordinary skill in the art.

Accordingly, the various embodiments are not to be limited in scope by the specific embodiments described herein. Further, although some of the embodiments have been described herein in the context of a particular implementation in a particular environment for a particular purpose, those of ordinary skill in the art should recognize that its usefulness is not limited thereto and that the various embodiments can be beneficially implemented in any number of environments for any number of purposes. While the foregoing description includes many details and specificities, it is to be understood that these have been included for purposes of explanation only, and are not to be interpreted as limitations of the various embodiments. Many modifications to the embodiments described above can be made without departing from the spirit and scope of this description.

Clouds of water molecules and their associated ions are called ligand structures. These ligand structures are the reason that salt ions do not recombine to form salt crystals. The ligands act as both a physical and electrostatic barrier preventing the recombination.

When a conductive electrode is immersed in an electrolyte solution, a very thin layer of ions, called the Helmholtz layer, is attached to the electrode where electron transfer can take place. This Helmholtz layer can only form when the ligands are attracted to the surface of the electrode and are destroyed as the ions are pulled into direct contact with the surface of the electrode. Further energy is required to supply the electrons involved in the electron transfer process.

The present invention uses an electrostatic field impinging on the ligands to move ions and their associated ligands en masse. By providing just enough energy to move the ligands and ions en masse, but not enough energy to separate the ligand structures, the reverse diffusion desalinator (RDD) is able to use minimal energy to remove ions from fluids.

No electron transfer takes place in the RDD system because the electrodes are insulated from the electrolyte. The low electrical potential, physical separation between the electrolyte and the electrode minimizes the buildup of a Helmholtz layer.

The providing of just enough energy to move the ligands and ions en masse can be accomplished by providing electrical pulses of low intensity in sequenced patterns to the space containing the ligands and their associated ions. The ligands and the associated ions then move with the pulsed sequence through the space, to an area for collection and removal. This can be accomplished using systems, such as those described herein.

FIG. 1 shows an exemplary electrode panel. Isolation of electrodes from the electrolyte can be accomplished by embedding the electrode wires in a panel. The panel can be made of a non-conductive material that is impervious to fluid penetration. For example, the panel can be plastic (e.g, ABS (Acrylonitrile Butadiene Styrene) plastic), glass, or ceramic. The panel serves to isolate each electrode from adjacent electrodes and to isolate the electrodes from the fluid being treated. Each completed electrode panel (100) can contain a plurality of electrodes (110). For example, the panel can contain at least 10, at least 20, at least 30, at least 40, at least 50, or at least 60 electrodes (110). Holes (120) can be placed in the corners of the electrode panel serve to connect and align sets of panels to ensure that the electrodes are in perfect registration. Spacer bars (130) can be molded into the panel (140) as a means to separate adjacent panels to create a void between panels for the fluid being treated. The panel can be hydrophobic and oleophobic since the panels may be exposed to aqueous solutions that may contain hydrocarbons.

Figure 2A:
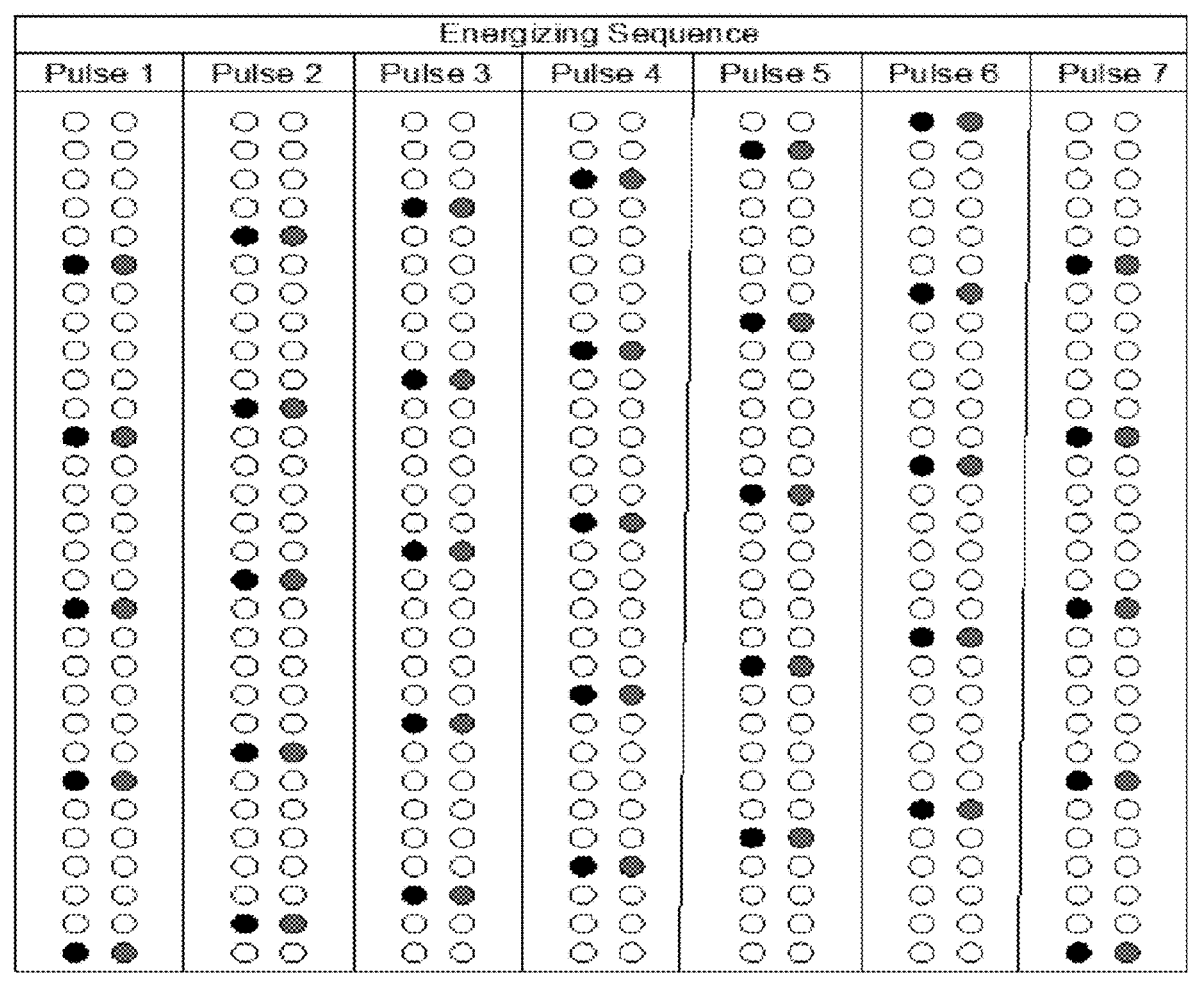

The electrodes can be connected to an electronic control circuit. The control circuit can sequentially energize, then de-energize, the electrodes. The sequencing of the electrodes in the array can be similar to the scrolling light pattern commonly seen in marquee signs used in advertising displays. FIG. 2A shows an exemplary sequencing pattern. The black dot represents the electrodes carrying a positive potential. The gray dot represents electrodes carrying a negative potential. The blank circles in each column represent electrodes that are not energized. Each set of two columns separated by the vertical lines represents the same electrode array at incremental steps in time. The left column shows the first step in the time sequence. At each sequential increment in time, the energizing pattern moves upward through the array. It is the movement of the electric fields that draws the ions into and through the array.

FIG. 2B shows another exemplary sequencing pattern. The black dot represents the electrodes carrying a positive potential. The gray dot represents electrodes carrying a negative potential. The blank circles in each column represent electrodes that are not energized. Each set of two columns separated by the vertical lines represents the same electrode array at incremental steps in time. The left column shows the first step in the time sequence. At each sequential increment in time, the energizing pattern moves upward through the array. It is the movement of the electric fields that draws the ions into and through the array.

Figure 4B:
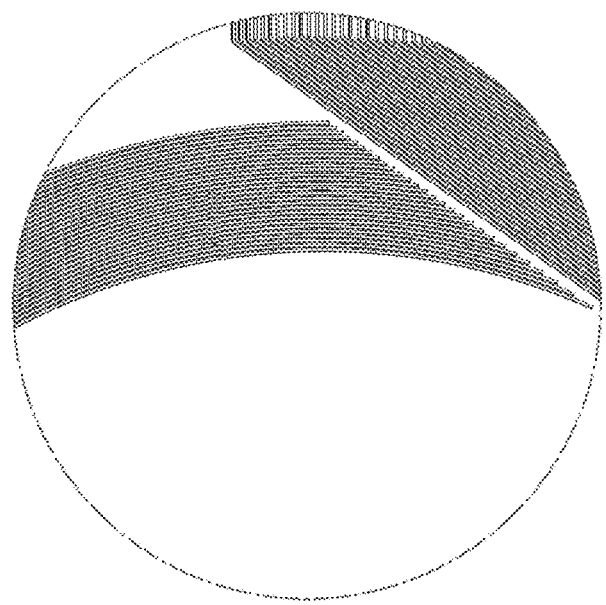
FIG. 4B depicts an detailed view of a portion of FIG. 4A according to exemplary embodiments.
Figure 4A:
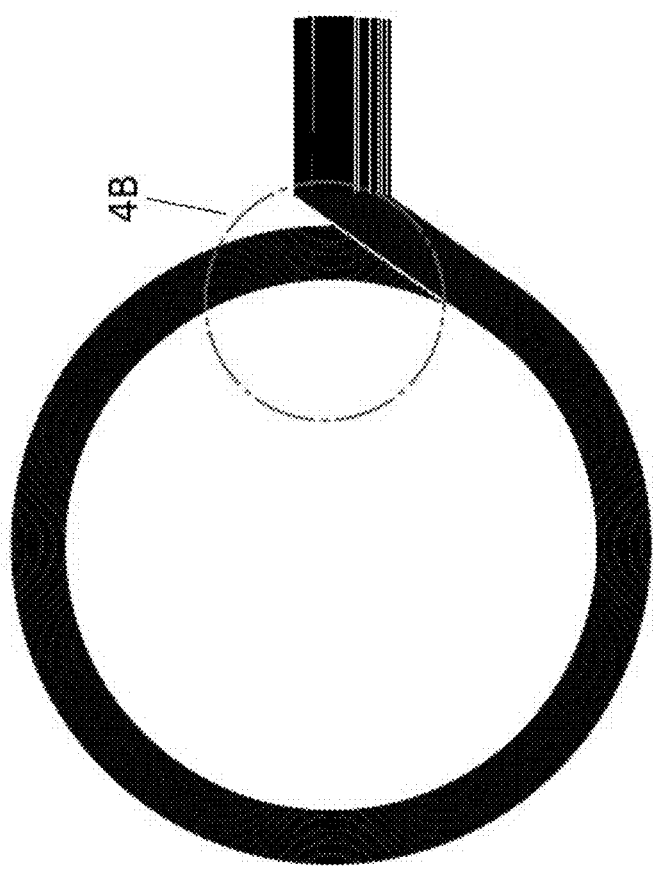
FIG. 4A depicts a radial array of electrodes according to exemplary embodiments.

The electrodes can be arrayed in any pattern, so long as the electrodes are coplaner. For example, the electrodes may be arrayed in parallel, radial, or concentric patterns, such as those shown in FIG. 3. The spacing and shapes of the electrodes within a pattern may vary. Polygonal patterns may also be used. An exemplary radial electrode array is shown in FIGS. 4A and 4B.

The rate at which the electrodes are sequenced and the strength of the electric field directly impacts the velocity at which the ions move through the array independent of fluid motion. The strength of the electric field depends on the potential between the electrodes and their spacing. The electric potential required to move the ions efficiently is also dependent on the temperature of the system. The electric field strength must be high enough to counteract the effect of thermally induced random collisions with water molecules.

The energy required to move the ions through the array is minimal, nearly equaling the increase in entropy resulting from the diffusion of the ions throughout the solution. In turn, the energy is approximately equivalent to the energy required to move the mass of the ions through the array in a given time. If the electric potential between electrode pairs is too high, energy will be wasted in pulling apart the ion pairs in solution which will form a Helmholtz layer adjacent to the electrode panel.

Figure 5:
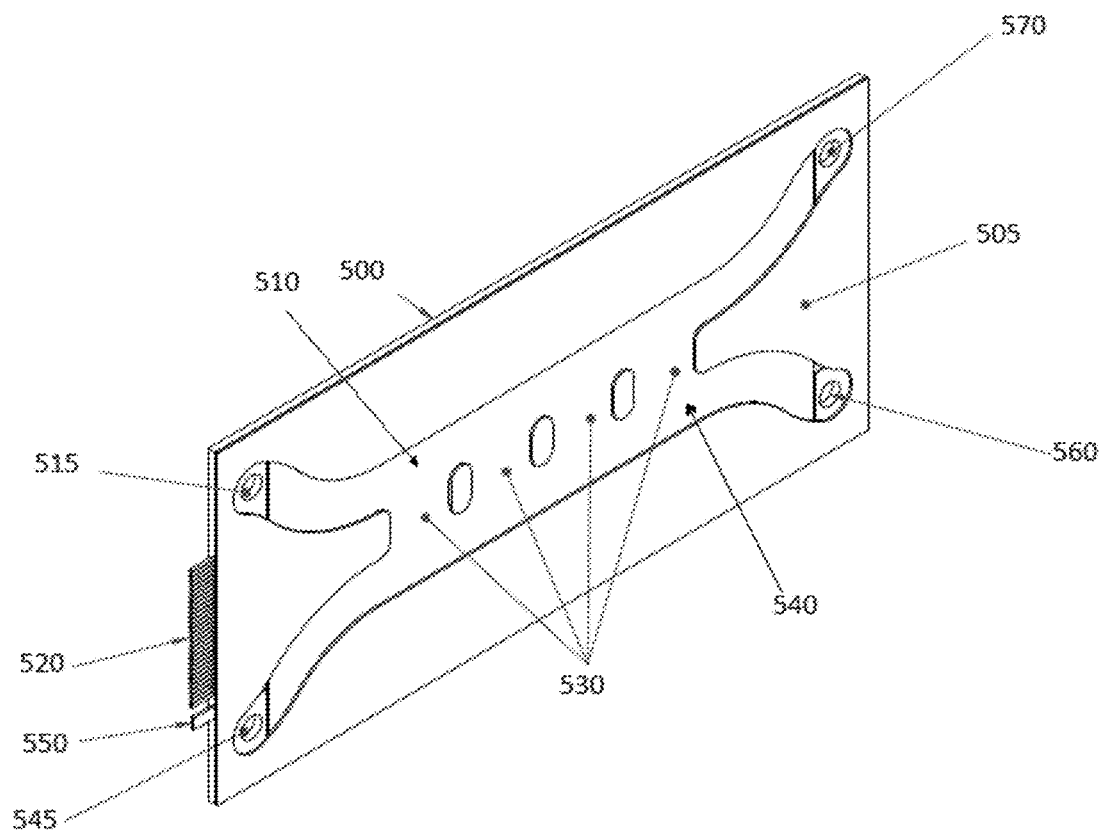
FIG. 5 depicts an axial flow system according to exemplary embodiments.

As illustrated in FIG. 5, a dynamic system of an electrode panel (500) can be utilized. The electrode panel can include a fluid channel overlay (505). The fluid channel overlay can be made out of any material that is non-conductive and impervious to fluid flow, such as plastic, glass, or ceramic. The dynamic system can include pumping saline water into the upper fluid channel (510) via the brine inlet port (515). A concentrate can be introduced into the system (545). As it moves through the system (500) from left to right, it can pass along a series of electrodes (520). The electrodes (520) can be arrayed in a horizontal pattern behind the upper fluid channel (510) and separated from them by a thin layer of material capable of providing electrical insulation and mechanical isolation from the fluid. For example, the material can be non-conductive and impervious to fluid penetration, such as plastic, glass, or ceramic.

The electrodes (520) can be sequentially energized cyclically from top to bottom. This sequential energizing sweeps the ions and their associated ligand structures down through the ion drains (530) and into the concentrate channel (540) at the bottom of the electrode panel (500). To prevent solution from the upper fluid channel (510) from being pumped into the concentrate channel (540), the concentrate circuit is a closed, constant volume system. Only the ions move from the upper fluid channel (510) to the concentrate channel (540). By contrast, the feed water system is an open system. As the concentration of salt in the concentrate increases a small amount of water is displaced and moves upward into the open circuit. Beneath the scrolling electrodes (520) is a guard electrode (550) that is always energized. The purpose of the guard electrodes (550) is to capture and hold ions as they are pumped into the concentrate channel (540). The concentrate that has passed through the system can be removed via the concentrate outlet (560), and the fluid can be discharged via the fluid discharge port (570). The salt precipitate can be mechanically removed from the settling tank.

Figure 6:
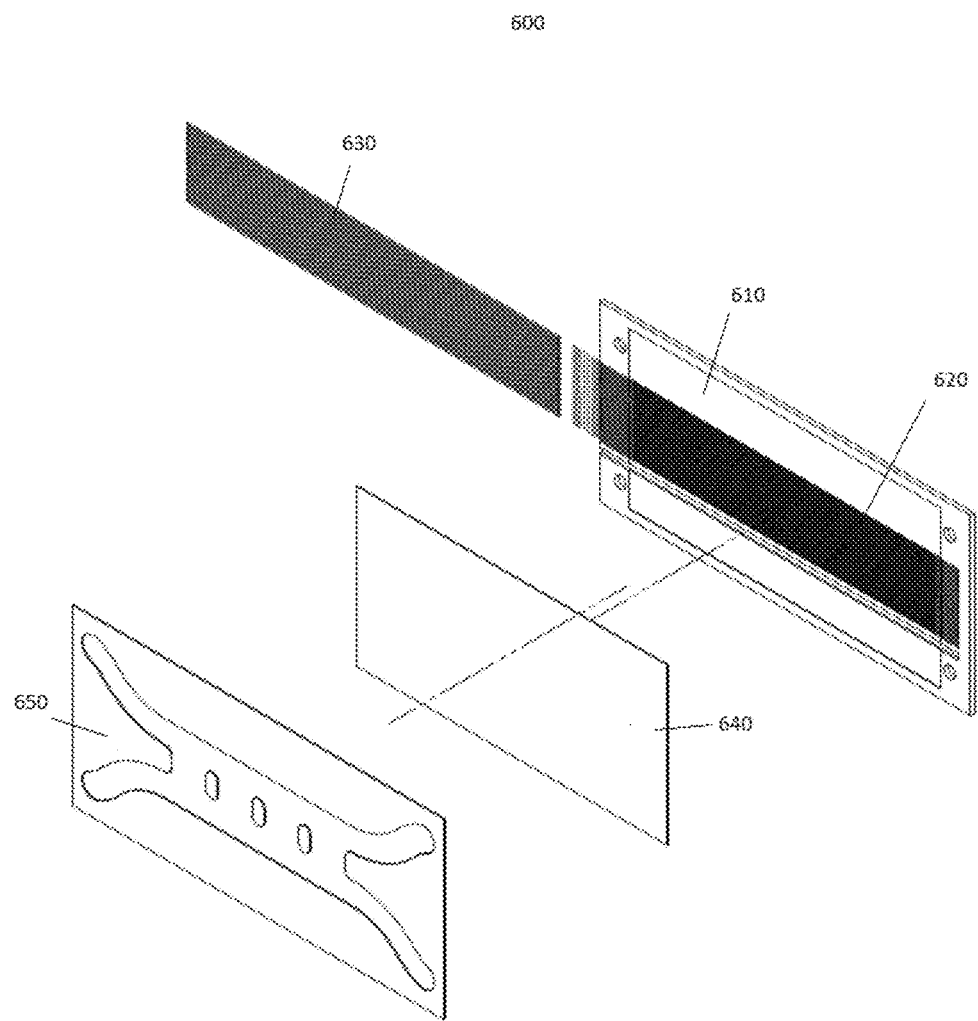
FIG. 6 depicts an axial flow system according to exemplary embodiments.

FIG. 6 is an exploded view of an axial flow electrode panel, like that shown in FIG. 5. The panel (600) includes a back panel (610) into which are molded grooves (620) to accommodate electrodes (630). The back panel (610) can be made of any material that is non-conductive and impervious to fluid penetration, such as plastic, glass, or ceramic. The electrodes (630) are metallic or conductive (e.g., brass, copper, tungsten, or compressed carbon) rods of small diameter. The rods are inserted into the grooves (620) in the panel (610). A thin plate (640) can be laminated to the panel (610) using an adhesive. For example, the thin plate (640) can be borosilicate glass, and the adhesive can be silicon-based. The plate (640) insulates the electrodes (630) from the saline solution and provides an extremely smooth surface that minimizes nucleation sites at which salt crystals might become attached.

A fluid flow overlay (650) can be laminated to the thin plate (640). The fluid flow overlay (650) can be made of any material that is non-conductive and impervious to fluid flow, such as plastic, glass, or ceramic. The fluid flow overlay (650) guides the flow of the fluids into and out of the electrode panel (600). The operating efficiency of the system is dependent on several factors. The most important factor is the length of the fluid channel created by the fluid channel overlay (650). If the fluid channel is too short, the ions will not have enough time to be moved into the concentrate channel in response to the electric fields emanated by the electrodes.

As a corollary factor, the velocity with which the saline fluid moves through the system is another factor. If the velocity is too high, the time during which the electric fields can influence the ions is limited. Turbulence is also a problem if the fluid velocity is too high. The system is designed to operate in the laminar flow regime. The term laminar flow refers to fluid flow without turbulence. The propensity of a fluid to flow in a turbulent manner is characterized by a number which is a function of the inertial and viscous characteristics of the fluid. The velocity of the fluid flow, the cross section of the flow and the perimeter surrounding the flow area determine a unique number that can be used to characterize the type of flow. This number is known as the Reynolds number. Low Reynolds numbers indicates that fluids will flow without significant turbulence. High Reynolds numbers indicate a turbulent flow regime.

Laminar flow through the axial flow system is necessary to prevent mechanical movement counter to the flow of ions induced by the applied electric fields. To ensure that the flow through the system is laminar, the rate at which fluid is pumped must be limited to achieve a Reynold's number of less than 2,300.

Figure 7A:
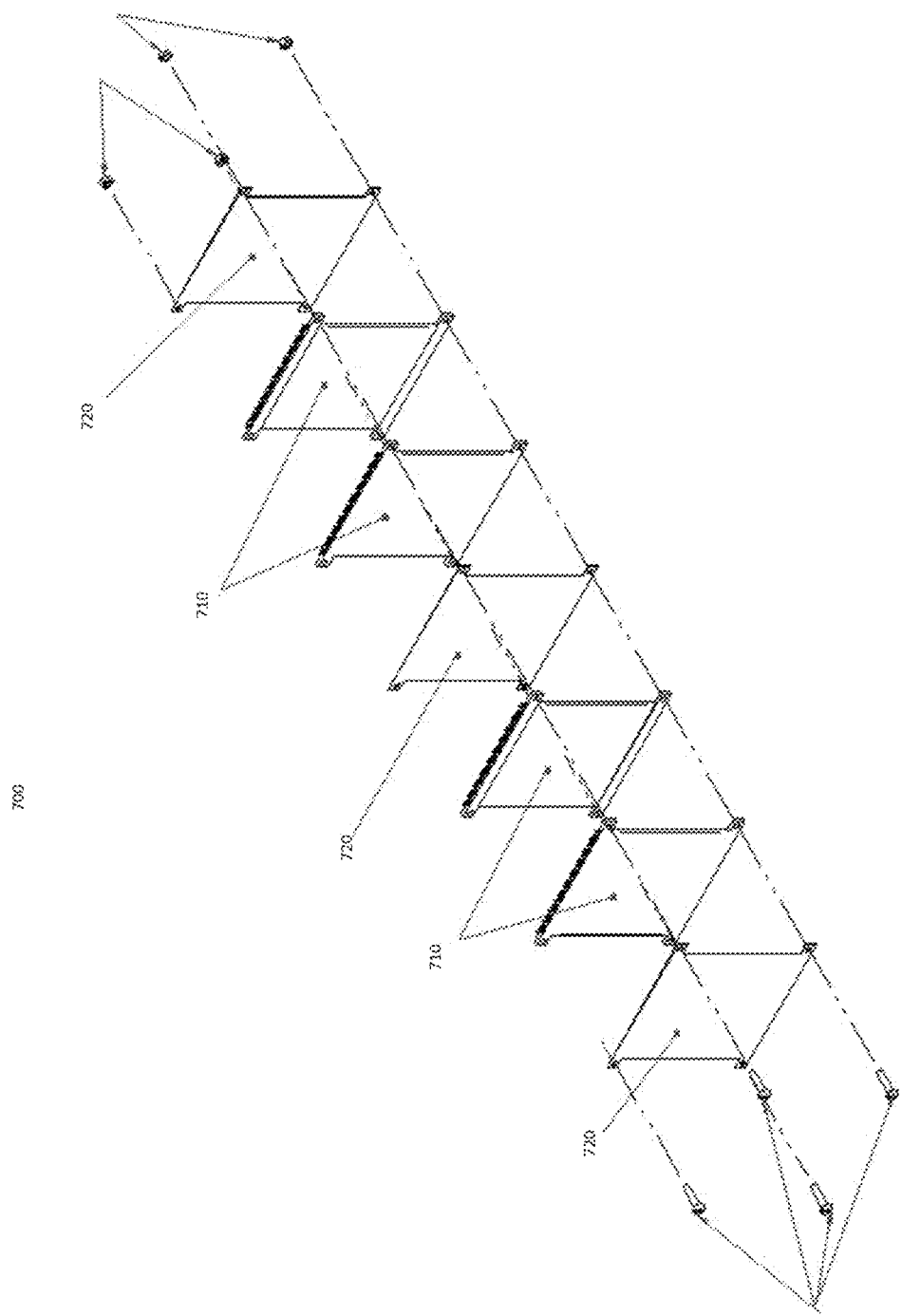
FIG. 7A depicts a static system according to exemplary embodiments.

The static system can be included into a module. FIG. 7A depicts a module (700) fitted with two electrode panels (710) held between shields (720). Any number of electrode panels (710) may be assembled into a module. In turn, the modules may be connected in series, parallel or in series-parallel fashion to achieve a system of any size.

Figure 7B:
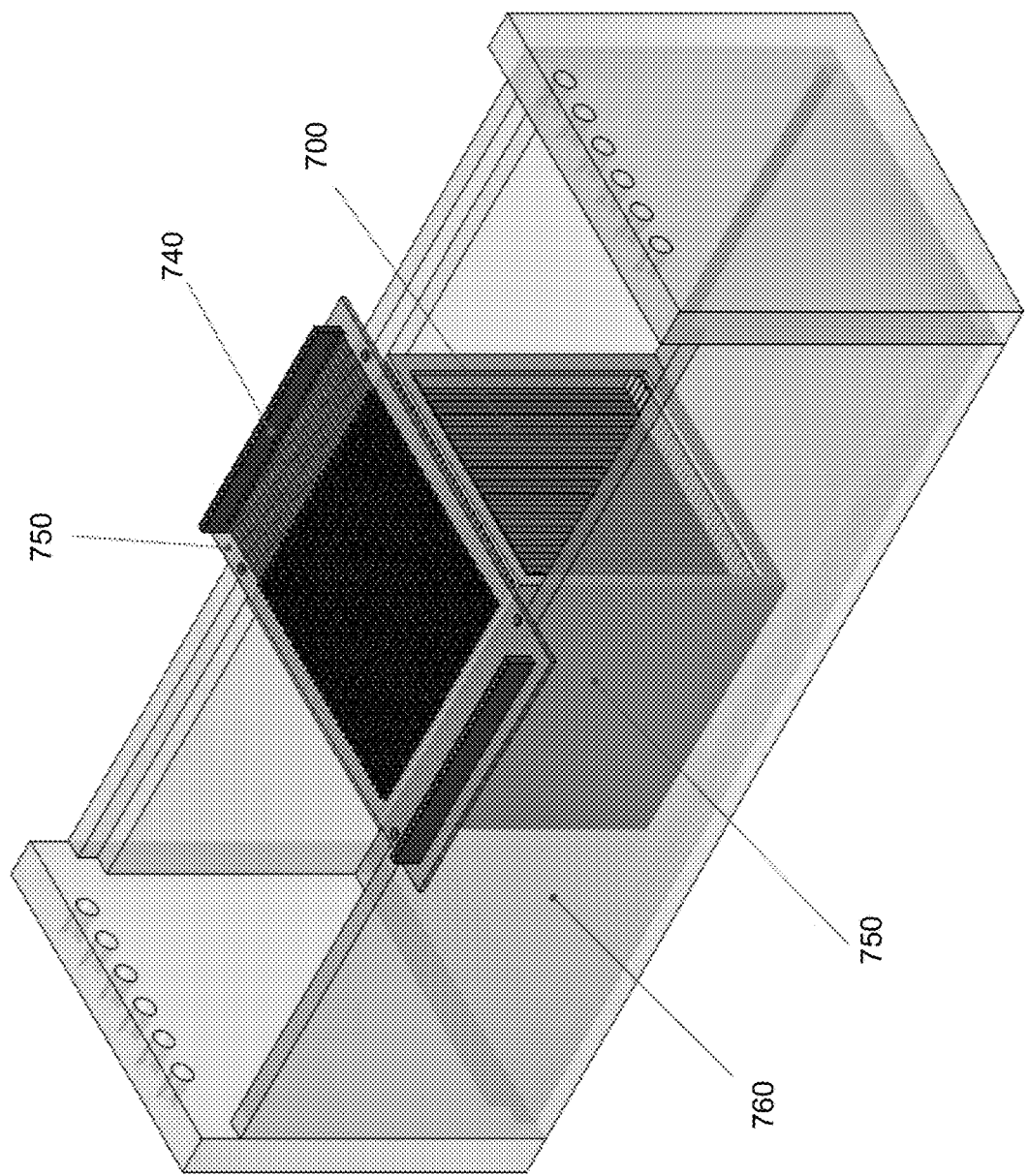
FIG. 7B depicts a static system according to exemplary embodiments.

FIG. 7B depicts an exemplary static system. The modules (700) of FIG. 7A are included in an electrode holder (750), within a tray (760). The electrodes are connected to an SIP connector (740), and contained within a header board (730). The ions pass from one side of the tray through the modules (700), where the electrodes within the modules (700) pull the ions from the one side of the system to the other side. This allows for the ions to be swept across the fluid system.

Figure 8:
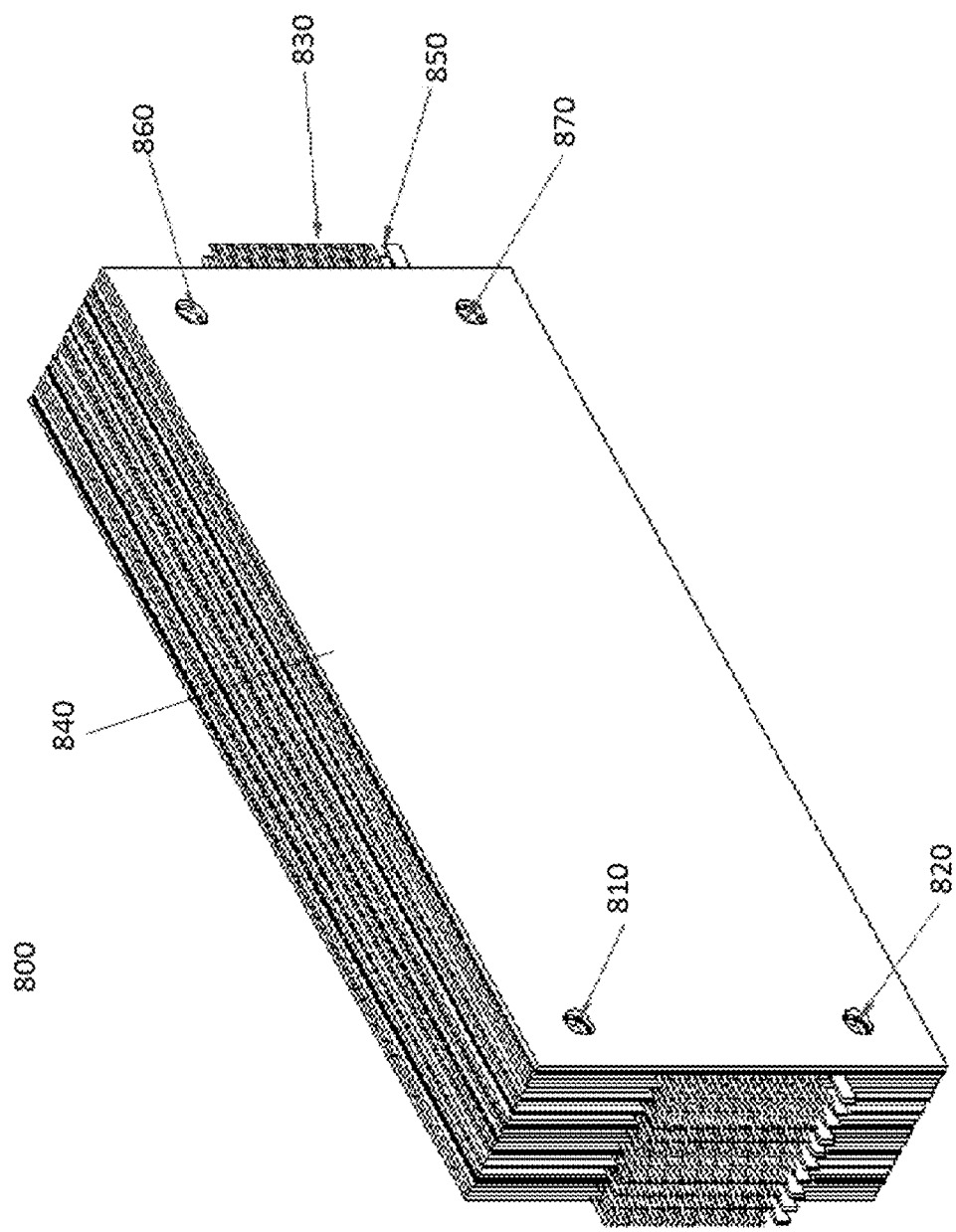
FIG. 8 depicts an electrode assembly that includes multiple axial flow modules according to exemplary embodiments.

FIG. 8 shows an electrode assembly (800) that includes multiple axial flow modules. The brine is pumped in via the brine inlet port (810), while the concentrate is introduced via the concentrate inlet port (820). The electrodes (830) are aligned amongst the congruently abutting modules (840). The modules contain a guard electrode (850) below the electrodes (830). The fluid is removed from the system via the treated water outlet port (860), while the concentrate is removed via the concentrate outlet port (870).

Figure 9:
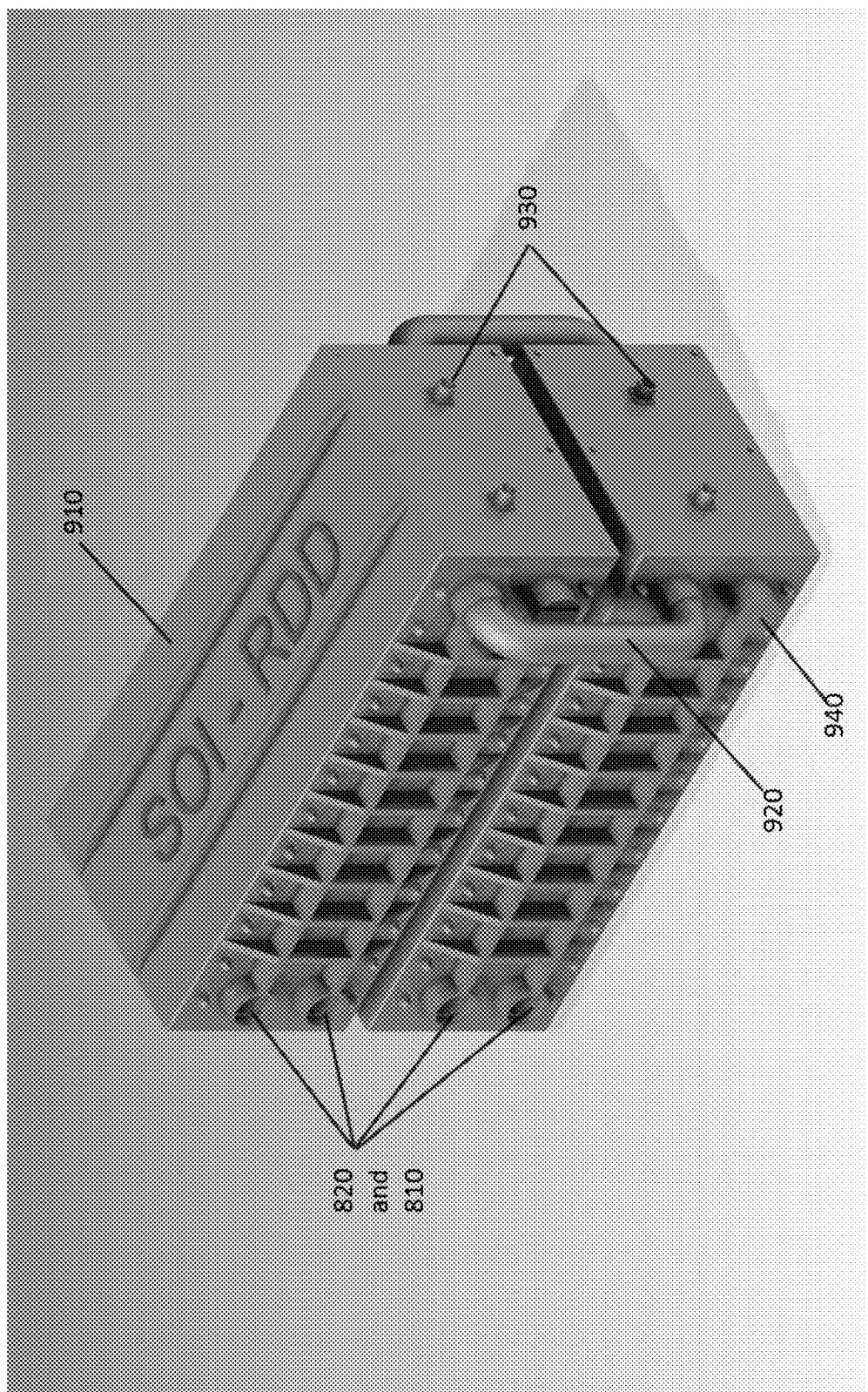
FIG. 9 depicts an electrode system that includes two electrode assemblies, according to exemplary embodiments.

FIG. 9 shows an exemplary system that includes two electrode assemblies, such as those showed in FIG. 8. The electrode assembly is contained in a housing (910). The concentrate inlet port (820) and brine inlet port (810) can be connected to the respective pumps or hoses. A connecting jumper pipe (920) can connect the two electrode assemblies. In some embodiments, the treated water outlet port (860) and the concentrate outlet port (870) are located in the place of the concentrate inlet port (820) and the brine inlet port (810). Electrical sockets (930) and plugs (940) are also included on the housing (910).

Figure 10:
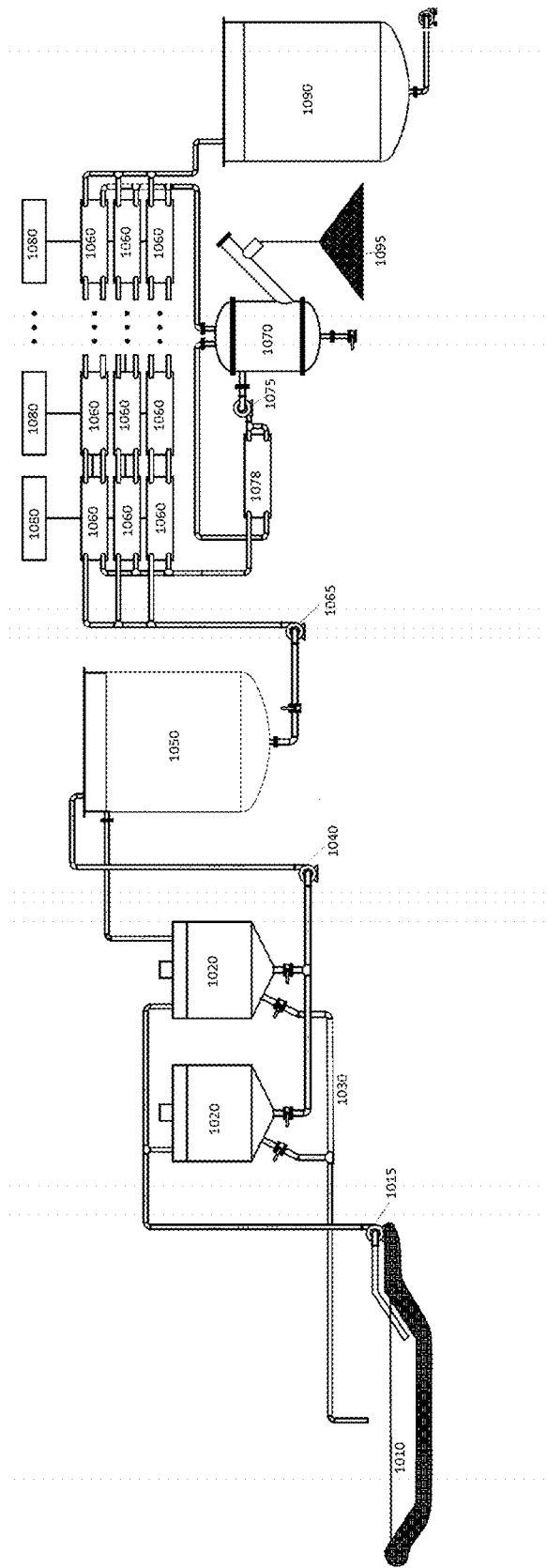
FIG. 10 depicts a separation system according to exemplary embodiments.

FIG. 10 shows an exemplary system that includes desalination modules, and multiple treatment stages. Fluid can be pumped from a salt water source (1010) using a saltwater feed pump (1015), and then passed through a sediment filter (1020). Discarded sediment can be passed back to the salt water source (1010) via a cleanout line (1030). Fluid from the sediment filter can be pumped from the sediment filter (1020) via a clean brine pump (1040) into a clean brine constant head surge tank (1050). Fluid from the clean brine constant head surge tank (1050) into a desalinator (1060) via a desalinator feed pump (1065). Concentrate can be pumped into a desalinator (1060) from a settling tank & precipitator (1070) via a concentrate feed pump (1075). The concentrate can be passed through a concentrate pre-treatment step (1078) prior to being pumped into the desalinator (1060). Electrical pulses can be passed to the desalinator (1060) via pulse generators (1080). After passing through multiple desalinators (1060), the fluid can be collected in a fresh water tank (1090). The salt ions removed via the desalinator (1060) can be collected as produced salt (1095).

Comparison to Other Technologies

Reverse Osmosis

The most common technology currently used to desalinate seawater is reverse osmosis. In this process, saltwater is pumped at very high pressure through a thin membrane. The salt ions and their associated ligands are too large to pass through the pores in the membrane allowing only pure water and smaller molecules to pass through. These membranes are subject to fouling by particulates in the feedwater and to chemical degradation. The rate of degradation can be quite severe if solvating reagents are present. The cost of pumping feedwater at very high pressure is high, as is the cost of replacing membranes.

By contrast, the cross sectional area of fluid channels through an RDD system is many orders of magnitude larger than the cross sectional area of the pores in a reverse osmosis membrane. The much larger cross section of the flow passages in the RDD system minimizes the potential for clogging or fouling. Further, fluid flow rates through the electrode modules in an RDD system are low, minimizing the potential of erosion.

Ions are moved through the array independent of the fluid flow rate. Only enough fluid is allowed to flow through the concentrate channel to flush out the concentrated salt solution at the discharge end of the array. The extremely low fluid transfer rate through the concentrate channel means that the rejection ratio of water not desalinated to desalinated water is extremely low when compared to a reverse osmosis system.

Capacitive Desalination Systems

In recent years, much research and development has been focused on capacitive desalination. Capacitive desalination uses conductive electrodes immersed in a salt solution to attract ions to their surfaces. As discussed earlier, these ions form a concentrated layer on their surface, effectively turning the system into a large super capacitor. As the electrodes gather their ion loads, the concentration of ions in the electrolyte between the electrodes is lowered. The depleted solution is then allowed to drain from the system while the ions cling to the electrodes. Once the system has been drained of the fluid between the electrodes, the system is recharged with solution and the polarity of the electrodes is reversed to repel the ions from the electrode surfaces. The system is then drained again to remove the concentrated brine. Once purged of the concentrated brine, the system is recharged with water to be desalinated and the cycle of charging and discharging is repeated.

Though the capacitive desalination systems require low pressure to operate, they are pulsed batch systems. RDD based systems are continual flow systems, ions are continually removed from a stream of constantly flowing feedwater.

Unlike an RDD system, there is a significant current flow through a capacitive desalination system as the capacitors are charged and discharged. Capacitive systems rely on separating ions rather than sweeping them from the fluids.

Evaporation Systems

Evaporation systems are the oldest of all desalination technologies and in one form or another they have been in use for centuries. These systems rely on changing the phases of water from liquid to vapor and back to liquid. The phase changes are effected by the addition and extraction of heat or by changing the pressures to which the liquids are exposed. The temperature of the seawater is first raised to the point where it begins to boil. The amount of heat required depends on the pressure over the water. Large flash evaporators subject the water to low pressure which reduces the boiling point of the water. Once the boiling point temperature has been reached, additional heat is required to complete the phase change from liquid to vapor.

Unless solar energy is available, the energy required to desalinate water by evaporation can be prohibitively expensive. Solar arrays capable of providing sufficient energy for a municipal desalination system are very large and are only useable during times of high solar influx. Solar evaporation system are not well suited to high latitudes.

Once the water has been converted to a vapor phase it must be condensed into liquid water. The process of condensation requires moving vast amounts of vapor through an apparatus to reduce the pressure resulting in rapid cooling that will convert the vapor into liquid water. Alternately, the vapor can be passed through a heat exchanger where cool untreated feedwater is used to extract heat from the vapor causing condensation to occur.

The physical footprint of a RDD system is far smaller than an evaporative system, and is not dependant on solar flux. Because there is no phase change from liquid to vapor and back to liquid the amount of energy per mass of fresh water produced is far smaller. Even if the electrical needs of an RDD system are provided by solar photovoltaic cells, the area required for the photovoltaic cells, including the area required to produce enough energy during off hours is very small when compared to conventional evaporation systems.

The inventions described herein provide significant advantages over existing technologies. For example, the inventions described herein operate at very low pressure compared to other systems in the prior art. Additionally, the inventions described herein can be integrated into continuous processes, not requiring batch or pulsed processing. The inventions described herein require no membranes that can clog or foul. Additionally, the inventions described herein are extremely low energy processes since ions are swept from the fluid (e.g., feedwater) rather than removing the fluid (e.g., feedwater) from the ions as in both reverse osmosis and evaporative systems. The rejection ratio of water in the inventions described herein (i.e., the amount of water that must be used to carry away the concentrated brine) is extremely low. Because the inventions described herein do not incorporate high pressure pumps, membranes, large solar collectors, or vapor to liquid condensers, the capital costs of the inventions described herein are low when compared to prior art technologies.

EXAMPLES

Example 1—Transverse Electrode System

Figure 11A:
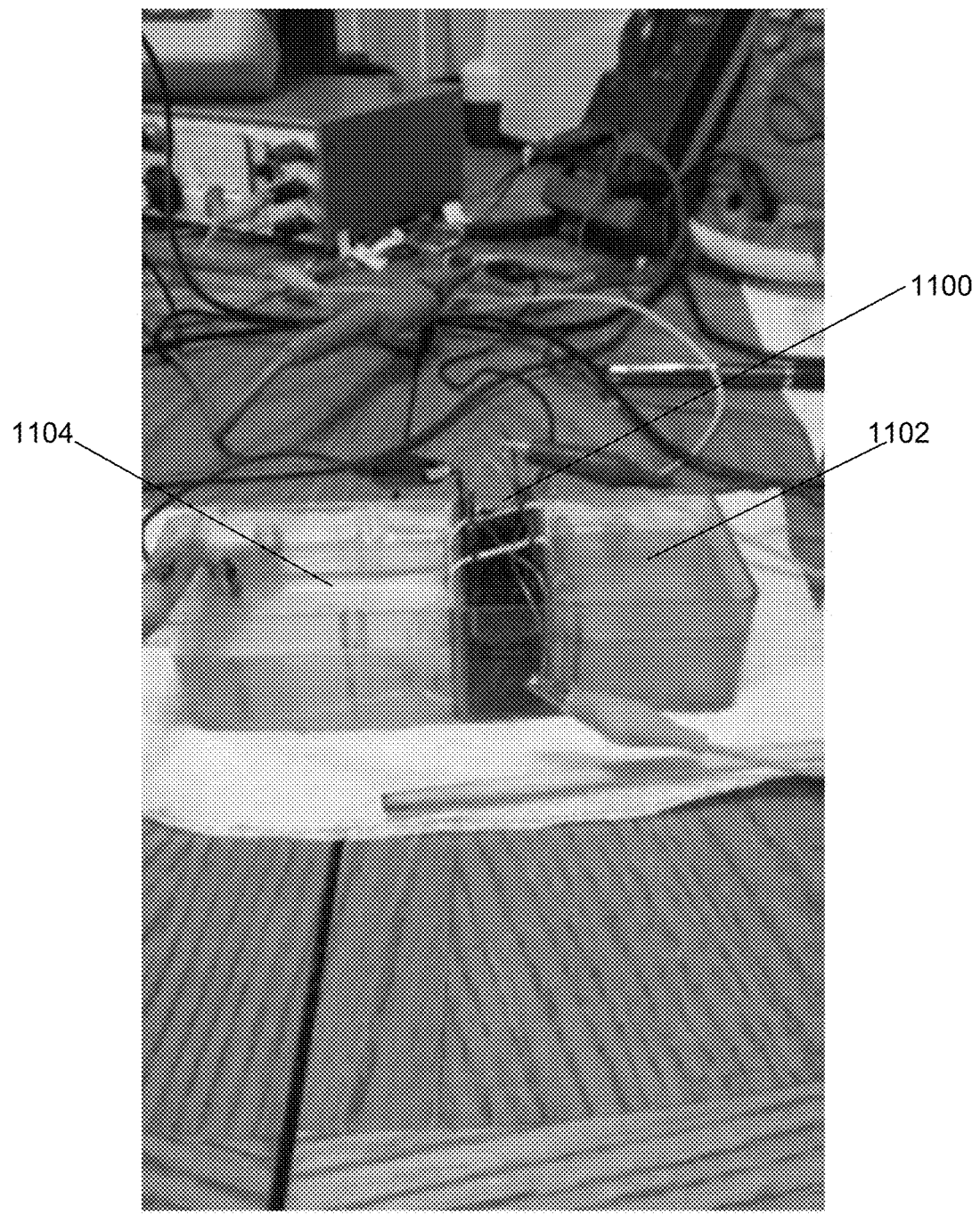
FIG. 11A depicts the system described in Example 1 in a first state.

FIG. 11A depicts a transverse electrode system was created in which the concept of sequential and cyclical electrode activation was tested. A small plastic tray was divided into two compartments by a stack of electrodes. Both sides of the tray were filled with deionized water. Crystals of potassium permanganate were dissolved in the water to the right side of the electrodes (1102). During the first part of the test, the electrodes (1100) were pulsed from left to right. While pulsing from left to right, virtually no ions were observed moving from right to left. This can be seen in FIG. 11A because the left side (1104) remains clear and the right side (1102) is cloudy because of the dissolved potassium permanganate.

Figure 11B:
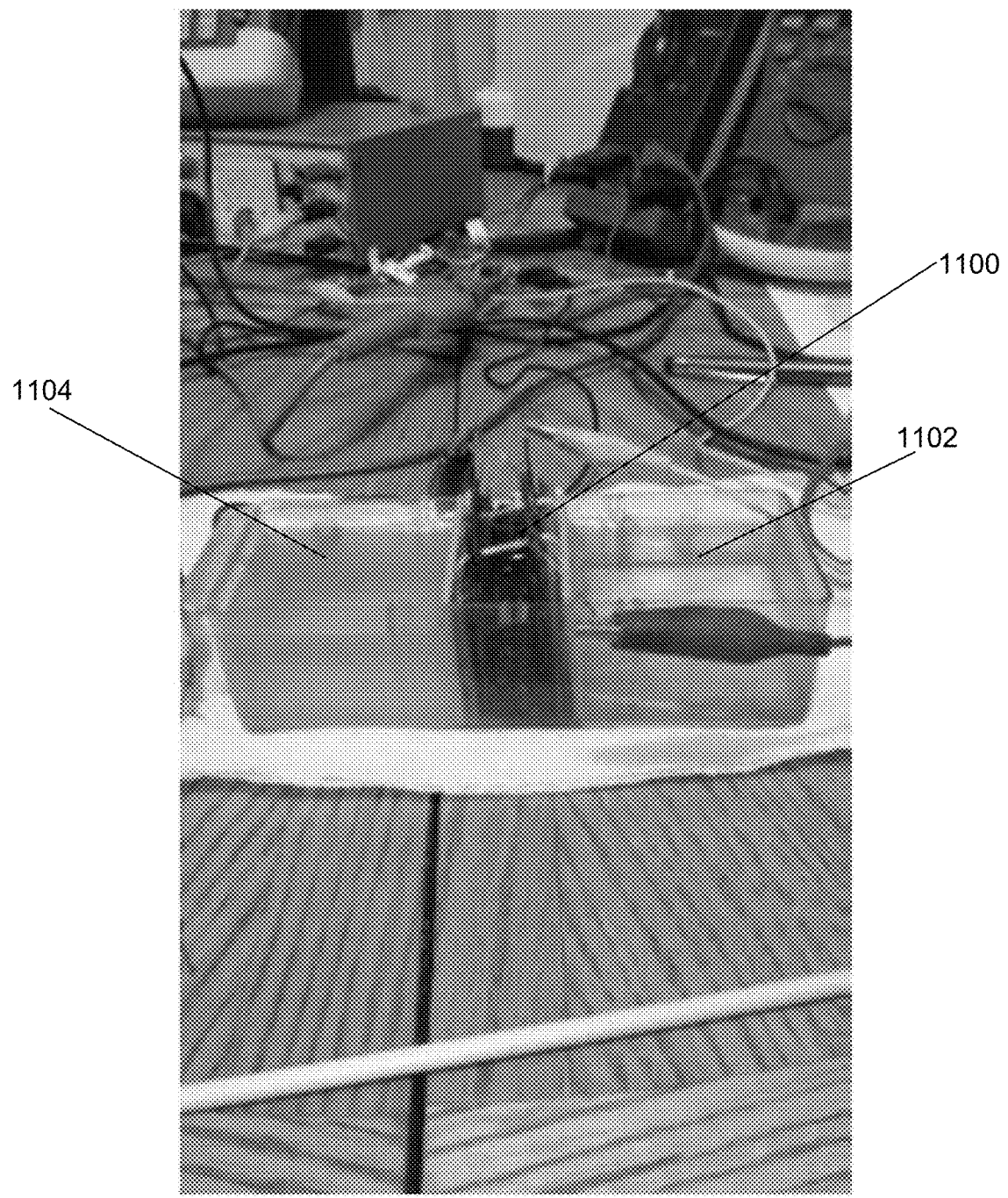
FIG. 11B depicts the system described in Example 1 in a second state.

In FIG. 11B, the leads were altered from the direction of the pulses so that they were now moving sequentially from right to left. As shown in FIG. 11B, virtually all of the potassium permanganate moved from the right hand side of the apparatus to the left (1104). The right hand side (1102) is now virtually clear.

The tests of the transverse electrode prototype were successful in demonstrating the "pumping of ions" using sequential cyclical activation of electrodes set in an array.

Example 2—Parallel Electrode System

The design of the parallel electrode is shown in FIG. 7B. The system consisted of a plastic tray fitted with a stack of electrode panels installed in the center. The orientation of the electrode panels allowed ions to be moved from either side of the electrode stack through the electrode stack to the opposite side, depending on the direction of the pulse sequence.

As with the first example, the fluid within the containment vessel was static. The purpose of the static tests was to ensure that ion migration from one side to the other was the result of the interaction between the ions and the applied electric fields and not the impetus of mechanical fluid motion.

Figure 12:
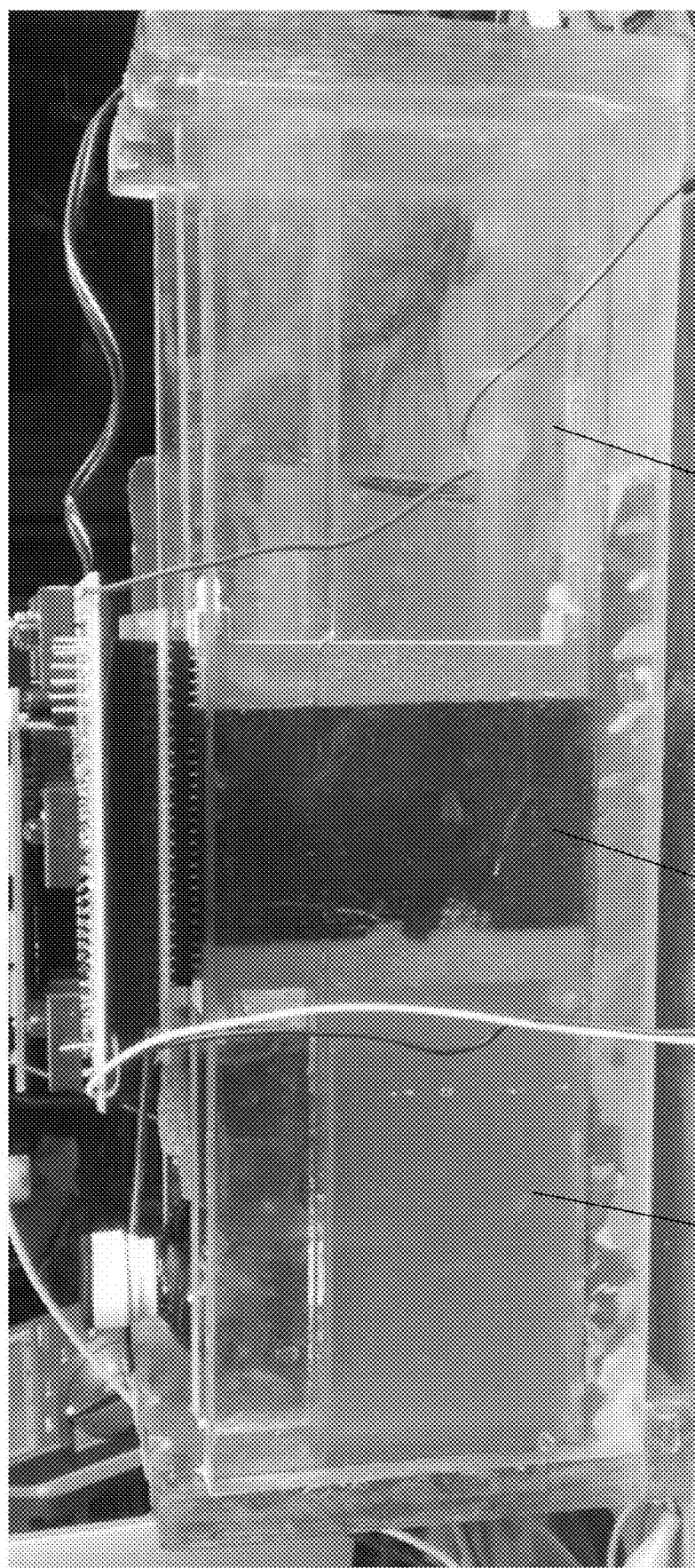
FIG. 12 depicts the system described in Example 2.

A set of four electrode arrays each comprised of two electrode panels and their respective shield plates were installed in the apparatus described in FIG. 7B and illustrated in FIG. 12. The system 1200 was filled with tap water from the city of Mills, Wyo. The tap water is very hard, containing high concentrations of calcium carbonate, iron carbonate and other slightly soluble salts. When the unit was energized, every sixth electrode within each electrode panel (1204) in the unit began scrolling from right to left. Almost immediately, the left side (1202) of the unit began to become murky as precipitates of calcium carbonate, iron carbonate and other slightly soluble ionic compounds began to form. The unit was operated for a few minutes. The water on the right side (1206) of the unit was virtually left free of any hard water ions. The results of this test were very dramatic and unanticipated. One interesting conclusion from this test is that the RDD technology could be effectively used to soften water without the use of ion exchange resins and the salt required to regenerate the resins.

Example 3—Parallel Electrode System

During subsequent tests of the system of Example 2, deionized water was poured into each side of the containment vessel. To better visualize the operation of the system, crystals of copper sulfate hepahydrate were added to the right side. Copper sulfate is a dark blue ionic compound. The amount added was equivalent to 280,000 parts per million, the solubility limit of copper sulfate at 70E Fahrenheit.

Figure 13:
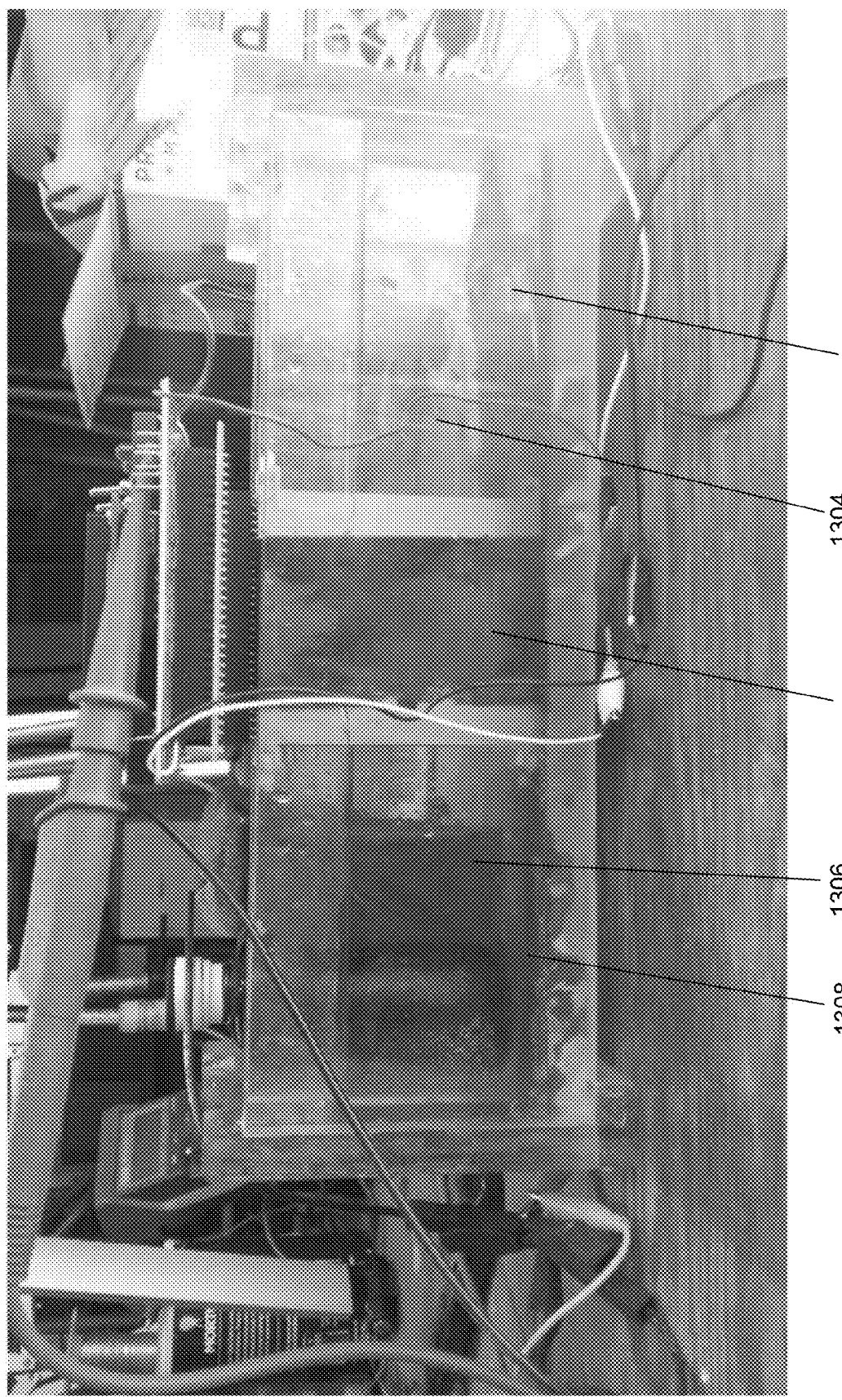
FIG. 13 depicts the system described in Example 3 at a first time.

FIG. 13 shows the experiment shortly after starting. In the system 1300, a pile of copper sulfate crystals (1302) is visible at the bottom of the right side chamber (1304). Clearly visible on the left side (1306) was a thin line of blue (1308). The test was static or quiescent. No mechanical agitation was imparted to the fluid. Only ions in close proximity to the electrode stack (1310) were influenced by the electric field between the electrodes. In turn, the only way ions could move toward the electrodes was through the process of diffusion.

Figure 14:
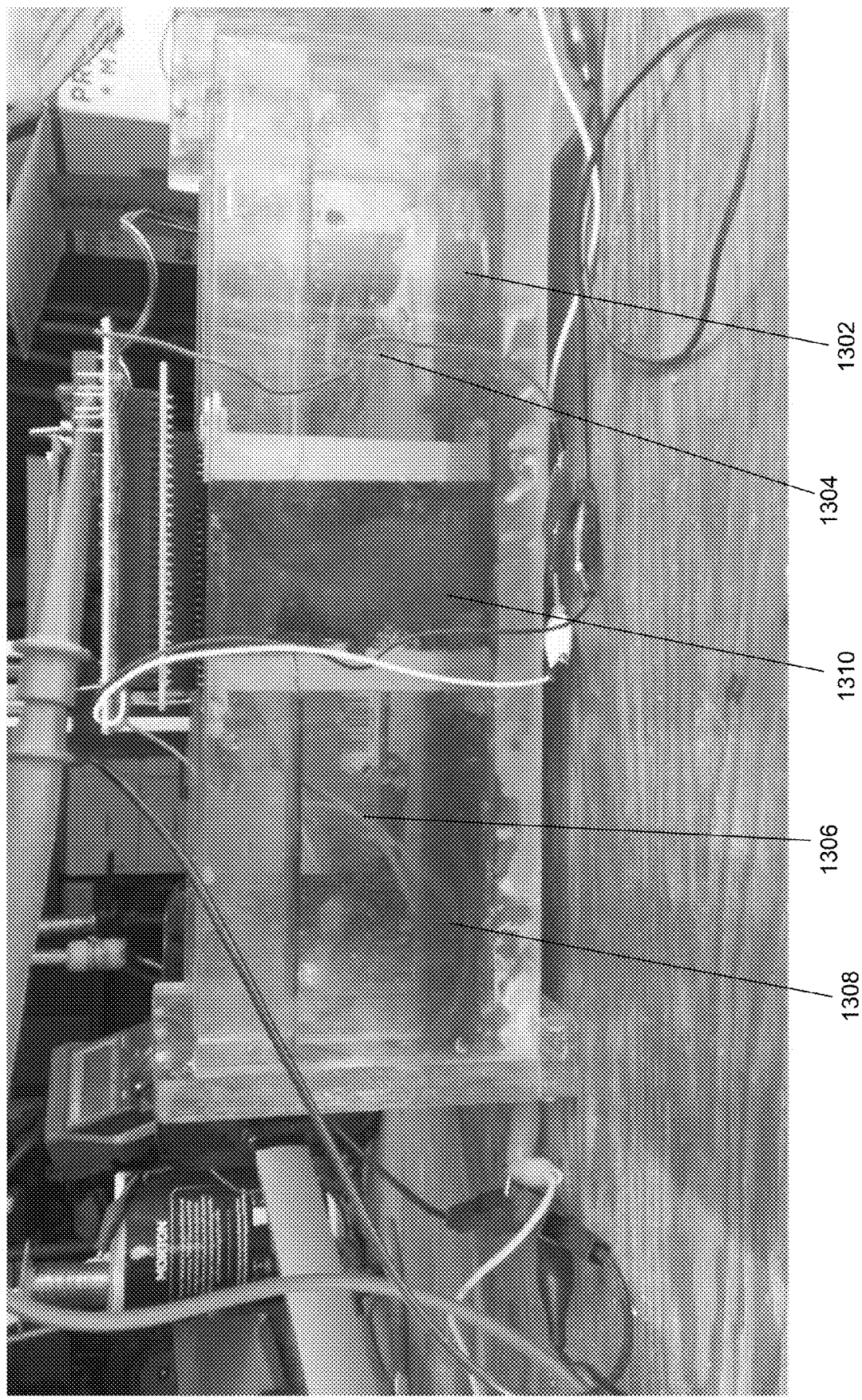
FIG. 14 depicts the system described in Example 3 at a second time.

FIG. 14 depicts the system 1300 after one hour, the amount of copper sulfate (1308) on the target side (left side (1306)) has increased dramatically while the pile of copper sulfate crystals (1302) on the right side (1304) has reduced significantly. The test continued until all of the crystals on the right side disappeared.

Figure 15:
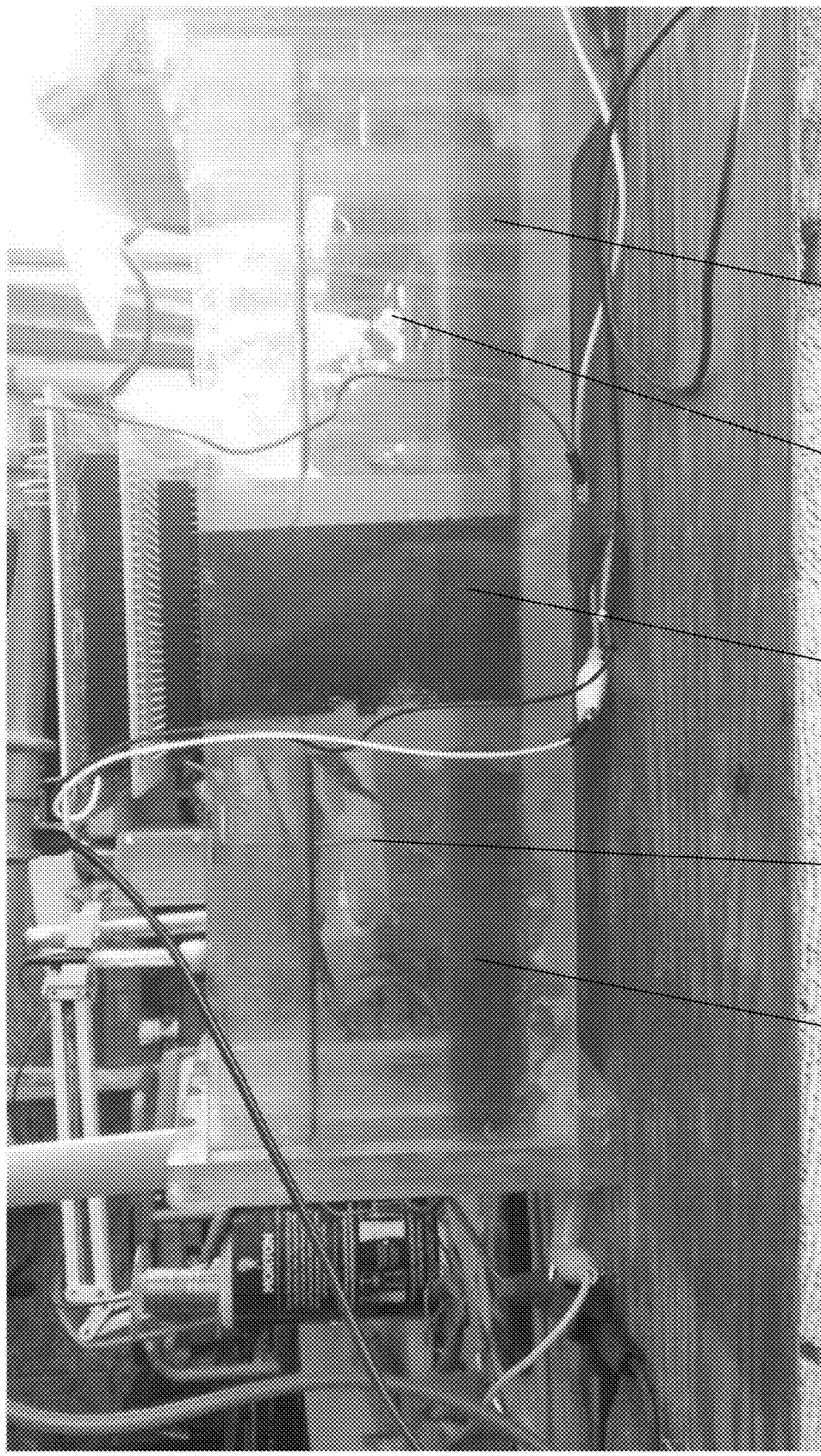
FIG. 15 depicts the system described in Example 3 at a third time.

FIG. 15 depicts the system 1300 as time passed, the copper sulfate crystals (1302) on the right hand side (1304) gradually went into solution. The amount of copper sulfate (1308) in the left chamber (1306) increased dramatically. Small crystals of copper sulfate formed as the concentration near the bottom of the left side chamber approached saturation, resulting in a murky blue color. A pile of crystals began to form adjacent to the electrodes at the bottom of the electrode stack (1310) in the left chamber. Eventually, all of the crystals on the right side of the prototype unit disappeared and were redeposited on the left side. FIG. 15 shows the experiment after three hours.

Example 4—Parallel Electrode System

In this example, a new soluble salt was used. solution of 280 grams of magnesium sulfate per 1 liter of water was prepared. At this concentration the solution was near saturation. The solution was poured into the prototype tray. A single electrode panel was placed in the center of the tray. In the first test, a potential of ±16 volts was applied in a series of scrolling pulses, each with a duration of 0.5 seconds. Magnesium sulfate, commonly known as Epsom Salt, is colorless and; therefore, no visual indication of ion movement can be seen. To overcome the lack of visual confirmation, two black cotton strings were dipped into the cells at the end of each test. One string being immersed in the cell from which the ions were being pumped, while the second string was immersed in the cell into which the ions were being pumped. The strings were extracted after thirty seconds and allowed to dry at ambient temperature and humidity.

Figure 16:
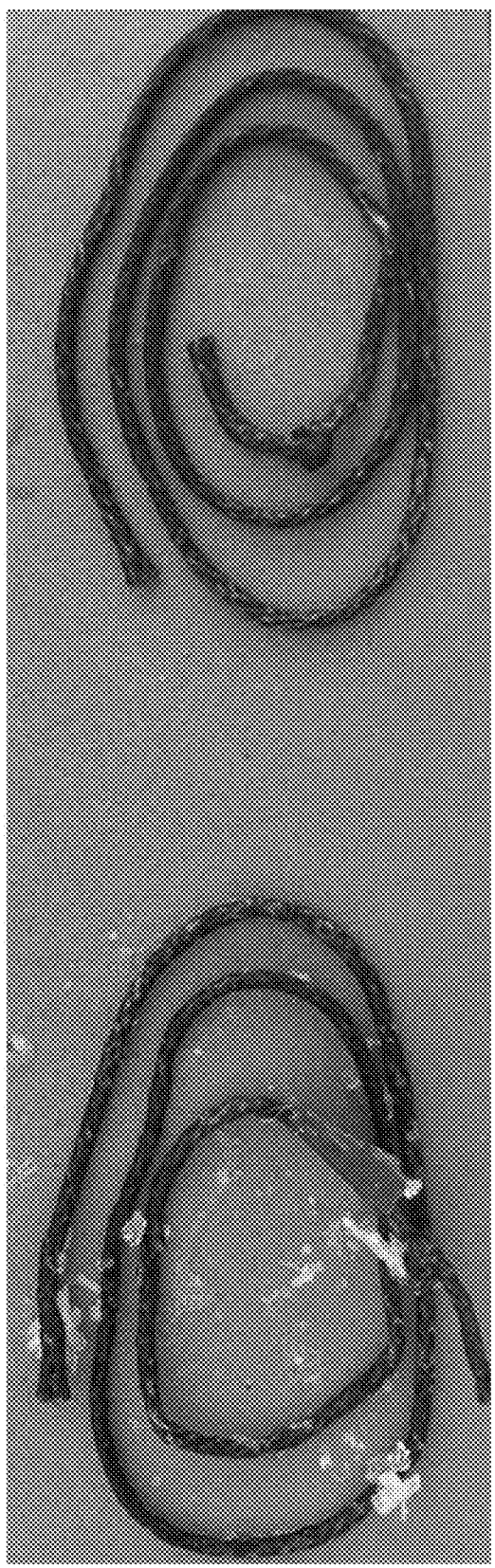
FIG. 16 depicts a first state of the strings described in Example 4.

FIG. 16 shows the strings after drying. It is clearly evident that more salt is associated with the string from the cell into which the ions were pumped than the other.

Figure 17:
FIG. 17 depicts a second state of the strings described in Example 4.

Subsequently, another test was conducted using magnesium sulfate. The test solution was prepared with a concentration of 280 grams of magnesium sulfate per 1 liter of eater. The solution was poured into the test apparatus and the system energized. After 100 hours the system was de-energized. Two black cotton strings were immersed in the source and target chambers for twenty minutes. The strings were extracted and dried under ambient conditions for 36 hours. FIG. 17 is a photograph of the two strings. It is obvious that the string from the target chamber has far more magnesium sulfate crystallization than the string from the source chamber. This again indicates a significant differential concentration of magnesium sulfate between the two chambers.

The formation of crystals during the test clearly indicates that the RDD process can generate a super saturated discharge solution. The practical implication of this observation is that RDD will have a very low rejection ratio of concentrated brine to fresh water.

These tests of the static prototype clearly demonstrate that the RDD technology is capable of handling solutions containing very high concentrations of dissolved salts. However, static tests require excessively long times to complete. This is due to the process being diffusion limited.

Example 5—Static System

Figure 18:
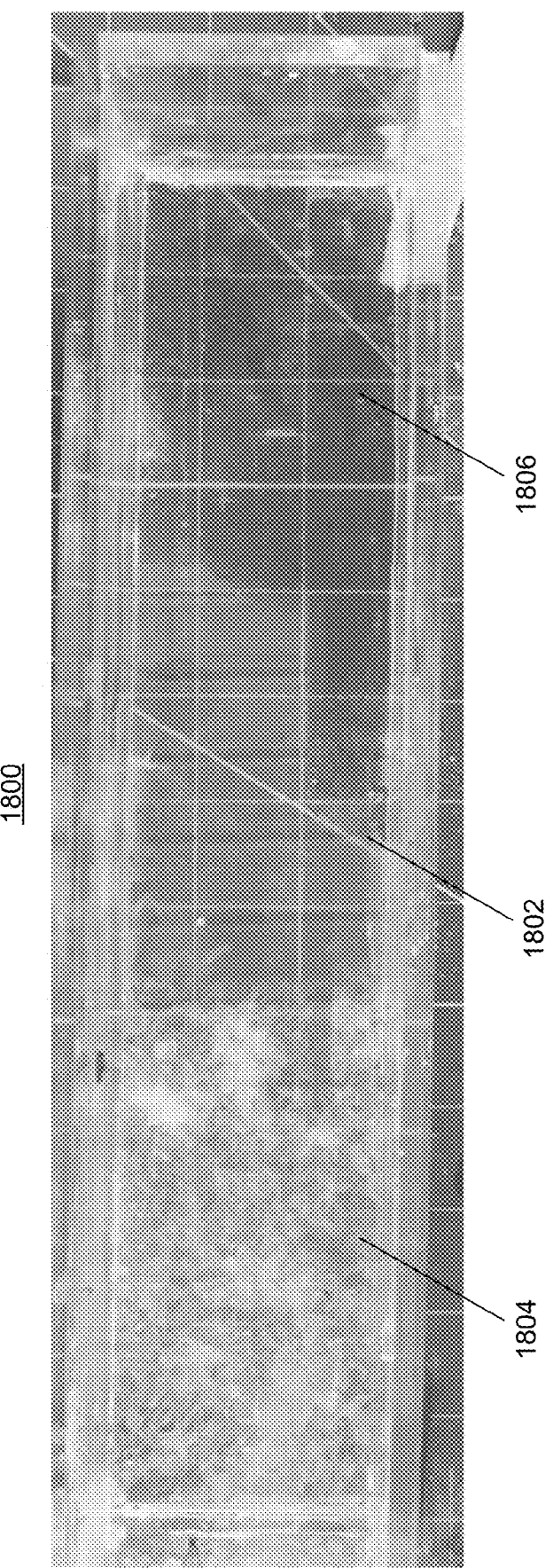
FIG. 18 depicts the system described in Example 5.

A solution containing 28 percent by weight of magnesium sulfate was prepared and poured into the test apparatus. A single electrode module was placed into the middle of the prototype. During the test an additional 122 grams of magnesium sulfate was added to the source. The test ran until crystals formed on target side and all magnesium sulfate crystals added to the source side had disappeared. The test was terminated and the module was removed. FIG. 18 is a photograph 1800 looking down at the top of the prototype tray (1800) after the electrode module was removed. The electrode module was located in the center of the tray. Its position is indicated by the yellow stain in the center (1802). The yellow stain was caused by the grease that was used to seal the outside edges of the electrode module. Crystals of magnesium sulfate are clearly visible in the target chamber to the left (1804). No crystals are present in the source chamber to the right (1806). The crystals average approximately ½ inch in length. The photograph is evidence that ions have been moved from the source chamber into the target chamber.

Example 6—Calculation of Energy Estimate Comparison Between RDD System and Ion Transfer System An electrochemical desalination systems pulls ions toward electrodes where electron transfer takes place. These systems require the use of large currents to desalinate relatively low salinity solutions. The following calculations are based on experimental observations of the static RDD system described in Example 5.

$MW_{es} := 120.366 \cdot \frac{gm}{mol}$   The Molecular weight of Epsom Salt $V_{sol} := 500 \cdot mL$   The volume of solution in the prototype $C_{es} := 280 \cdot \frac{gm}{L}$   The concentration of Epsom Salt in the prepared solution $Add_{es} := 122 \cdot gm$   The amount of Epsom Salt added during the test.

$Mass_{es} := V_{sol} \cdot C_{es} + Add_{es} =$ 0.262 kg   The total mass of he Epsom salt in the system $Moles_{es} := \frac{Mass_{es}}{MW_{es}} =$ 2.177 mol   The moles of Epsom salt in the system There are 2 charges for each magnesium ion therefore, the number of moles of charge is $Moles_{ces} := 2 \cdot Moles_{es} = 4.353$ mol $Faraday := 96485.33289 \cdot \frac{C}{mol}$   Faraday's Constant $Chg_{trans} := Moles_{ces} \cdot Faraday = 4.2 \times 10^5$ C $t_{exp} := 100 \cdot hr$ $Current_{avg} := \frac{Chg_{trans}}{t_{exp}} = 1.167$ A   This would be the average current required to extract the ions from the system if electron transfer were the mechanism used.

Since the actual current was not measurable on the power supplies which could register to the milliamp, the power required to desalinate the test solution was approximately 1100 times less than the power required by a conventional electrochemical system.

Example 7—Continuous Flow System

Figure 19:
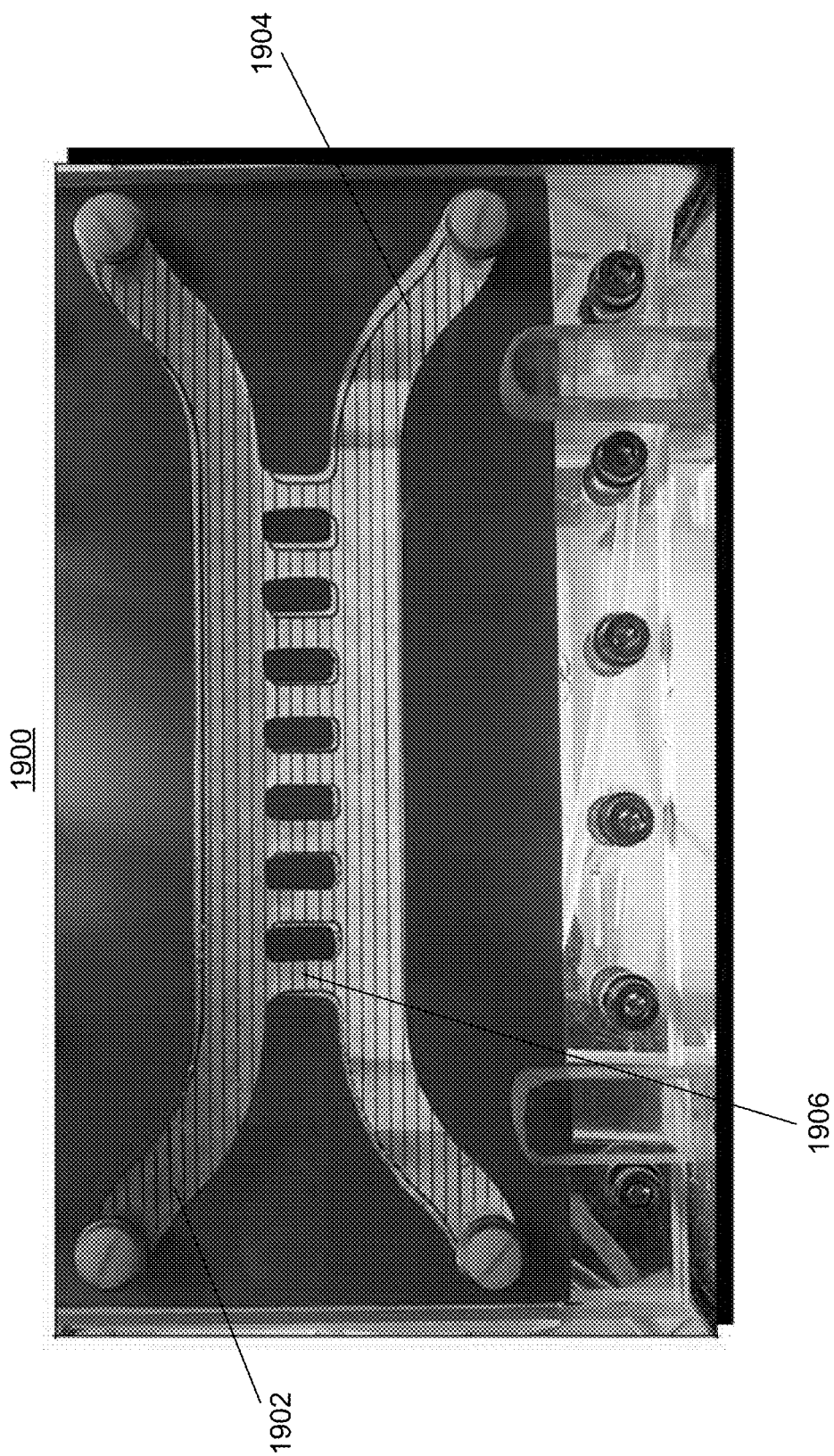
FIG. 19 depicts the system described in Example 7.

FIG. 19 shows a test system 1900. Water colored with a green dye was added into a source feed tank in the system 1900, which is similar to the system such as that is shown in FIG. 5. Water without dye was added into the concentrate tank. The pumps feeding both the upper channel (1902) and the lower channel (1904) were energized. The upper channel (1902) is the brine channel which would contain the fluid (e.g., water) that is treated in the system. The lower channel (1904) is the concentrate channel which would contain the fluid that contains the ions, etc. removed from the fluid being treated in the brine channel. The speeds of the pumps were adjusted to assure that the flowrate in both channels was equal. It is not necessary to operate the pumps at the same speed. The results demonstrated that there was virtually no turbulent mixing between the two channels 1902 and 1904, thus demonstrating the system 1900 has laminar flow. A small amount of mixing could be seen in the ion drains, such as for example at 1906. This mixing occurs because of the change in the direction of fluid flow as feedwater descends and concentrate ascends after entering the system.

The invention claimed is:

1. A method of removing one or more of ions, ionic complex, ionic compounds, and charged particles from a fluid, the steps of which comprise:
    placing a fluid comprising one or more of ions, ionic complex, ionic compounds, and charged particles in contact with an electrode panel, the electrode panel comprising a plurality of electrodes, wherein the electrodes are both physically isolated and electrically insulated from the fluid, and the fluid is allowed to flow across the electrode panel;
    providing the plurality of electrodes with an electric charge in an alternating pattern across the electrode panel such that the one or more of ions, ionic complex, ionic compounds, and charged particles are caused to move across the electrode panel from a first side to a second side; and
    collecting the ions that have been passed through the electrode panel on the second side from the fluid remaining on the first side.

2. The method of claim 1, wherein the electrode panel comprises a plurality of electrodes in a planar array.

3. The method of claim 1, wherein the electrode panel comprises at least two electrode panels that are congruently aligned.

4. The method of claim 1, wherein the pattern is a scrolling pattern.

5. The method of claim 4, wherein the scrolling pattern is at least 3 items long before repeating.

6. The method of claim 1, wherein the electrodes are embedded in the panel.

7. The method of claim 6, wherein the panel is made from a non-conductive material that is impervious to fluid flow.

8. The method of claim 7, wherein the material is plastic, glass, or ceramic.

9. The method of claim 1, wherein the fluid is static or dynamic.

10. The method of claim 9, wherein the fluid is dynamic and laminar flow is maintained throughout the flow of the fluid.

11. The method of claim 10, wherein the electrodes are arrayed horizontally.

12. The method of claim 1, wherein the electrodes are arrayed in a parallel pattern.

13. The method of claim 12, wherein the spacing and/or shape of the electrodes within the pattern are varied.

14. The method of claim 1, wherein the electrode panels are comprised of an oleophobic material and/or a hydrophobic material.

15. The method of claim 1, further comprising passing the fluid that has been passed through the electrode panels through at least one additional electrode panel connected in sequence to the electrode panels.

16. The method of claim 1, wherein the electrode panel comprises an electrode assembly.

17. The method of claim 1, wherein the fluid continuously flows past the electrode panel.

18. The method of claim 17, wherein the continuous flow is maintained by a pump.

* * * * *